Patented June 22, 1937

2,084,404

UNITED STATES PATENT OFFICE

2,084,404

BRAKE FLUID

Earl Bowman Millard, Newton, Mass., assignor to Bendix Products Corporation, South Bend, Ind., a corporation of Indiana No Drawing. Application February 4, 1935, Serial No. 4,994

4 Claims. (Cl. 252—5)

This invention relates to fluid compositions, and most particularly to fluids adapted for the transmission of pressures through wide ranges of temperature. Pressure transmission fluids are used for various purposes. They are sometimes used, for instance, in hydraulic brake systems and in hydraulic shock absorbers.

A pressure fluid must have certain specific characteristics if it is to be used efficiently for the purposes suggested above, and must have all of these characteristics if it is to function satisfactorily. The lack of any one of these characteristics makes the fluid useless. Though it is relatively easy to find many fluids having most of the desired characteristics, yet it has been found exceedingly difficult to discover compositions entirely satisfactory in every respect.

The fluid must have a suitable viscosity varying little throughout a comparatively wide range of temperature, and must have a low freezing point and a high boiling point. It must not react readily with the material of which the container, conduit, and other parts of the system are formed, and especially it must not attack rubber or rubber compositions, or metals such as brass, aluminum, copper, and steel. It must, furthermore, have no swelling effect on vulcanized soft rubber, such as that of which the piston cups and other rubber fittings used in some of the contemplated systems, are usually composed. It must have a relatively small coefficient of expansion and must be both physically and chemically stable throughout wide temperature variations.

Heretofore compositions of castor oil and certain alcohols have been extensively used. These compositions have, prior to my discovery, been considered the best pressure fluids available. I have found, however, certain compositions which, while possessing all of the good characteristics of the previously preferred compositions, are in certain respects superior thereto.

An object of this invention therefore is to provide a fluid having characteristics which make it desirable for use as a pressure fluid and having particularly all of the above mentioned desirable characteristics to as great a degree as possible. Specific features of the compositions discovered and hereinafter disclosed are that they will not solidify, precipitate crystals, decompose, nor become unstable at low temperatures; they have high boiling points and will not (whether at room temperature or heated) react appreciably with the usual metals, with rubber, with rubber compositions, nor with combinations of the metals and rubber or rubber compositions; and they have a suitable viscosity varying little throughout a comparatively wide range of temperatures.

Further objects and features of the invention will be apparent from consideration of the subjoined specification and claims.

The problem involved herein is somewhat similar to the problem involved in providing anti-freezing compounds in general and heretofore the use of various materials developed for anti-freezing compounds have been suggested for use as pressure fluids. Although the compositions forming the subject matter of this invention would be satisfactory as cooling mediums, they also possess additional characteristics particularly desirable in transmission fluids which are not present nor necessary in ordinary antifreeze fluids. Also, as suggested above, they are in some respects more desirable than the usual pressure transmission fluids.

The difficulty of the problem involved is illustrated by the amount of research that has been devoted to it and by the disadvantages of the various compositions and material heretofore suggested and tested. All water solutions boil at too low a temperature. The metallic salt solutions are usually corrosive and deposit crystals at their respective saturation points. Apparently all acids, nitriles, amides, phenols, aldehydes, etc., attack copper and cast iron. All hydrocarbons, nitrogen compounds and ketones, and most ethers tested attack rubber. Most esters except those found in castor oil, cause rubber to swell. Glycerine, whether used alone or in solution, solidifies at a comparatively high temperature. Glycols alone are very viscous at relatively high temperatures. Monohydric alcohols alone and in many solutions boil at relatively low temperature.

Castor oil may be mixed with alcohol and the mixture (whether a true solution or not) possesses most of the above mentioned desirable characteristics to a high degree. However, when subjected to cold for an extended period of time the mixture becomes too viscous for use, the castor oil apparently solidifying out of the mixture, even though none of the mixture would freeze even if subjected to much lower temperatures for shorter periods of time.

Bearing in mind the above mentioned necessary characteristics, objects, and difficulties, I have discovered that while ethers and alcohols alone boil at too low a temperature and triethanolamine alone is too viscous even at relatively high temperatures, yet a liquid composition comprising triethanolamine mixed with another compound chosen from the group consisting of the alcohols and the ethers possesses all of the desired characteristics. I have found that the mono and dihydroxy alcohols of five and six carbon atoms are the alcohols best suited for the purposes desired and that the glycol ethers are the best ethers. Triethanolamine mixes with diacetone alcohol, ethylene glycol monoethyl ether, diethylene glycol monoethyl ether, fusel alcohol, or isoamyl alcohol to produce particularly efficient mixtures.

I have found that a mixture of 50% diacetone alcohol and 50% triethanolamine is a particularly efficient mixture. This mixture does not boil until 284° F. It does not attack steel. The mixture does not attack rubber and the swelling effect on rubber is less than that of any other usual pressure fluid known. The viscosity is satisfactorily uniform over the desired temperature range.

I have found that a mixture of 50% diethylene glycol monoethyl ether and 50% triethanolamine is only slightly less efficient. It does not boil until 388° F. Similarly, a small quantity of an inhibitor prevents corrosion of metals. It does not attack rubber nor swell rubber to an appreciable extent and the viscosity is satisfactorily uniform. A mixture of 50% ethylene glycol monoethyl ether and triethanolamine boils at 379° F. and has similar favorable characteristics corresponding to the diethylene glycol monoethyl ether mixture.

I have found that fermentation amyl alcohol (which is sometimes called fusel oil or fusel alcohol, and which consists chiefly of isoamyl alcohol), when mixed with triethanolamine, also forms a mixture which has all of the desirable characteristics to a high degree. If the fermentation amyl alcohol is distilled to obtain a slightly higher boiling point alcohol before mixing with the glycol, the boiling point characteristic of the mixture is improved. One preferred mixture comprises approximately 25% triethanolamine and approximately 75% high boiling point fusel alcohol. Naturally a similar mixture of triethanolamine and isoamyl alcohol is also a very good mixture.

The fluids described above have suitable viscosities throughout relatively wide temperature ranges, low freezing points, and high boiling points. They have relatively small swelling effect on vulcanized soft rubber and are not corrosive to metal parts. They are stable throughout wide temperature ranges, do not crystallize, nor does any constituent solidify out under the low temperature conditions which may be met in practice. They are relatively small coefficients of expansion with heat.

Having thus described in detail several embodiments of my invention, I desire it to be understood that they are for the purpose of illustration only and various changes may be made therein without departing from the spirit and scope of the invention.

I claim:

1. A liquid composition consisting of fusel alcohol, and a triethanolamine.

2. A liquid composition consisting of isoamyl alcohol, and triethanolamine.

3. A liquid composition comprising approximately 75% fusel alcohol and approximately 25% triethanolamine.

4. A liquid composition comprising at least 50% fusel alcohol and at least 25% triethanolamine.

EARL BOWMAN MILLARD.